United States Patent
Straehle et al.

(10) Patent No.: US 12,226,905 B2
(45) Date of Patent: Feb. 18, 2025

(54) METHOD FOR TRAINING A CONTROL STRATEGY

(71) Applicant: Robert Bosch GmbH, Stuttgart (DE)

(72) Inventors: Christoph-Nikolas Straehle, Weil der Stadt (DE); Damian Boborzi, Augsburg (DE); Jens Stefan Buchner, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 244 days.

(21) Appl. No.: 17/902,258

(22) Filed: Sep. 2, 2022

(65) Prior Publication Data

US 2023/0081738 A1   Mar. 16, 2023

(30) Foreign Application Priority Data

Sep. 6, 2021   (DE) .................... 10 2021 209 761.8

(51) Int. Cl.
   *B25J 9/16* (2006.01)
(52) U.S. Cl.
   CPC ..................... *B25J 9/163* (2013.01)
(58) Field of Classification Search
   CPC .............. B25J 9/163; B25J 9/1664; G05B 2219/40499; G05B 2219/40519; G06N 3/088; G06N 3/092; G06N 3/044; G06N 3/045; G06N 3/047; G06N 3/08
   See application file for complete search history.

(56) References Cited

U.S. PATENT DOCUMENTS

2021/0256358 A1 *   8/2021   Deng .................... G06N 3/045

OTHER PUBLICATIONS

"Imitative Planning using Conditional Normalizing Flow", Jul. 31, 2020 arXiv:2007.16162 [cs.RO] https://doi.org/10.48550/arXiv.2007.16162 (Year: 2020).*
Jaegle et al. "Imitation by Predicting Observations," Proceedings of the 38th International Conference on Machine Learning, PMLR 139, 2021.
Zhu et al. "Off-Policy Imitation Learning from Observations," 34th Conference on Neural Information Processing Systems, NeurIPS 2020, Vancouver, Canada.
Liu et al. "Energy-Based Imitation Learning", Proc. of the 20th International Conference on Autonomous Agents and Multiagent Systems (AAMAS 2021).
Ghasemipour et al. "A Divergence Minimization Perspective on Imitation Learning Methods", 3rd Conference on Robot Learning (CoRL 2019), Osaka, Japan.

* cited by examiner

Primary Examiner — Abby Y Lin
Assistant Examiner — Dylan M Katz
(74) Attorney, Agent, or Firm — NORTON ROSE FULBRIGHT US LLP; Gerard A. Messina

(57) ABSTRACT

A method for training a control strategy. The method includes providing training data, which demonstrate a control behavior, according to which control actions are to be generated, and training the control strategy with the aid of imitation learning by minimizing a measure of deviation between the distribution of state transitions according to the control strategy and the distribution of state transitions according to the demonstrated control behavior using the training data.

7 Claims, 3 Drawing Sheets

METHOD FOR TRAINING A CONTROL STRATEGY

CROSS REFERENCE

The present application claims the benefit under 35 U.S.C. § 119 of German Patent Application No. DE 10 2021 209 761.8 filed on Sep. 6, 2021, which is expressly incorporated herein by reference in its entirety.

FIELD

The present invention relates to a method for training a control strategy.

BACKGROUND INFORMATION

An effective method of training a robotic device (such as, for example, a robotic arm, but also an autonomous vehicle), in such a way that it is able to manage even in situations with which it has not been explicitly confronted, is imitation learning.

The aim of imitation learning is to train a control strategy using expert data, which contain expert demonstrations, in such a way that it behaves like an "expert" (i.e., entity from which the expert demonstrations originate). Promising approaches of imitation learning are based on adversarial methods and show a good efficiency in the interaction with examples and simulators. Adversarial methods, however, are frequently unstable and difficult to optimize.

Imitation learning may be subdivided according to which pieces of information in the expert data are available; methods, in which the expert demonstrations are present as the results of pairs made up of state and executed action are referred to as learning from demonstrations (LfD). Learning from observations (LfO) describes methods, in which only pieces of state information, i.e., in particular, pieces of information about successive states, are available in the expert data.

Learning from observations enables a simpler collection of expert data, the training in such case is typically more difficult due to fewer pieces of information in the expert data. Accordingly, effective training methods for learning from observations are desirable.

Jaegle A., Sulsky Y., Ahuja A., Bruce J., Fergus R., Wayne G.; "Imitation by Predicting Observations," in: Proceedings of the 38th International Conference on Machine Learning, https://arxiv.org/pdf/2107.03851.pdf, describe a method for imitation exclusively from observations, which achieves an efficiency during continuous control tasks comparable to experts and also shows robustness even in the presence of observations that have nothing to do with the task.

SUMMARY

According to various specific embodiments of the present invention, a method is provided for training a control strategy, including providing training data, which demonstrate a control behavior, according to which control actions are to be generated, and training the control strategy with the aid of imitation learning by minimizing a measure of deviation between the distribution of state transitions according to the control strategy and the distribution of state transitions according to the demonstrated control behavior using the training data.

The above-described method enables efficient, non-adversarial learning from observations. It enables the training of a successful control strategy with high data efficiency. The target function (or the corresponding loss function) corresponds to the measure of deviation (for example, a divergence) between two distributions. It is therefore interpretable and the loss is zero if the trained control strategy provides the same state transitions as the demonstrated control behavior (i.e., the "expert"). The trained control strategy then behaves like the expert and the degree of deviation thus provides an objective criterion as to how good the training control strategy is. In adversarial learning, such a measure is difficult to calculate.

According to various exemplary embodiments of the present invention, the minimization of a divergence between a trajectory distribution according to a control strategy to be trained and a trajectory distribution according to expert control strategy (demonstrated in by expert data) is reformulated in such a way that it is in the form of the target function (to be maximized) of a method for reinforcement learning with maximization of the entropy. This involves, in particular, a suitable formulation of the reward term, which is structured in such a way that it includes terms (probabilities), for which the probability models may be learned from the expert data or from control passes (i.e., interaction with the surroundings).

This approach makes it possible to train the control strategy using an arbitrary method for reinforcement learning with maximization of the entropy and thus to achieve an effective training for learning from observations.

Various exemplary embodiments are specified below.

Exemplary embodiment 1 is a method for training a control strategy as described above.

Exemplary embodiment 2 is a method according to exemplary embodiment 1, the measure of deviation being the Kullback-Leibler divergence between the distribution of state transitions according to the control strategy and the distribution of state transitions according to the demonstrated control behavior, or the Kullback-Leibler divergence between the distribution of state transitions according to the demonstrated control behavior and the distribution of state transitions according to the control strategy.

The use of the Kullback-Leibler divergence for the target function to be optimized enables a use of the target function as the target function of a maximal entropy RL method with an efficiently estimable reward term.

Exemplary embodiment 3 is a method according to exemplary embodiment 1 or 2, the measure of deviation being minimized by applying a maximal entropy reinforcement learning method to a reward, whose shared maximization with the entropy of the control strategy corresponds to the minimization of the measure of deviation.

This enables an efficient training using an existing maximal entropy reinforcement learning method, which may be suitably selected depending on the application.

Exemplary embodiment 4 is a method according to exemplary embodiment 3, including training a conditioned normalizing flow probability model for the transition distribution and a conditioned normalizing flow probability model for the inverse action distribution and minimization of the measure of deviation using the trained conditioned normalizing flow probability models, the reward being estimated using the trained conditioned normalizing flow probability models. Conditioned normalizing flows are a class of normalizing flows, in which the mapping of the basic distribution onto the resultant distribution is conditioned by an input (here, for example, states), in order to model conditioned probabilities.

Exemplary embodiment 5 is a method according to exemplary embodiment 4, further including training a conditioned normalizing flow probability model for the distribution of state transitions according to the demonstrated control behavior and minimizing the measure of deviation using the trained conditioned normalizing flow probability models, the reward being estimated using the trained conditioned normalizing flow probability models.

Conditioned normalizing flow probability models enable an exact approximation of given distributions and may be efficiently evaluated.

The conditioned normalizing flow probability models may be trained at least partially offline. Stability problems as they occur during adversarial learning may thus be avoided.

Exemplary embodiment 6 is a method for generating a control action including:
training a control strategy according to one of exemplary embodiments 1 through 5 and generating a control action according to the trained control strategy.

Exemplary embodiment 7 is a control unit, which is configured to carry out a method according to one of exemplary embodiments 1 through 6.

Exemplary embodiment 8 is a method for testing a control method for a robotic device, including simulating a control scenario including multiple different robotic devices, the robotic devices being controlled according to control actions, which are ascertained by the method according to exemplary embodiment 6.

The imitation learning makes it possible to simulate a realistic behavior of the robotic devices, for example, the behavior as in the case of real road users. The control method may thus be tested under realistic conditions.

Exemplary embodiment 9 is a test unit, which is configured to carry out the method according to exemplary embodiment 8.

Exemplary embodiment 10 is a computer program including commands which, when they are executed by a processor, prompt the processor to carry out a method according to one of exemplary embodiments 1 through 6.

Exemplary embodiment 11 is a computer-readable medium, which stores commands which, when they are executed by a processor, prompt the processor to carry out a method according to one of exemplary embodiments 1 through 6.

BRIEF DESCRIPTION OF THE DRAWINGS

In the figures, similar reference numerals relate in general to the same parts in all the various views. The figures are not necessarily true to scale, the emphasis instead being placed in general on the representation of the principles of the present invention. Different aspects of the present invention are described in the following description with reference to the figures.

DETAILED DESCRIPTION OF EXAMPLE EMBODIMENTS

The following detailed description refers to the figures which, for the purpose of explanation, show specific details and aspects of this description, in which the present invention may be carried out. Other aspects may be used and structural, logical and electrical changes may be carried out without departing from the scope of protection of the present invention. The different aspects of this description are not necessarily mutually exclusive, since some aspects of this description may be combined with one or with multiple other aspects of this description in order to form new aspects.

Various examples are described in greater detail below.

Figure 1:
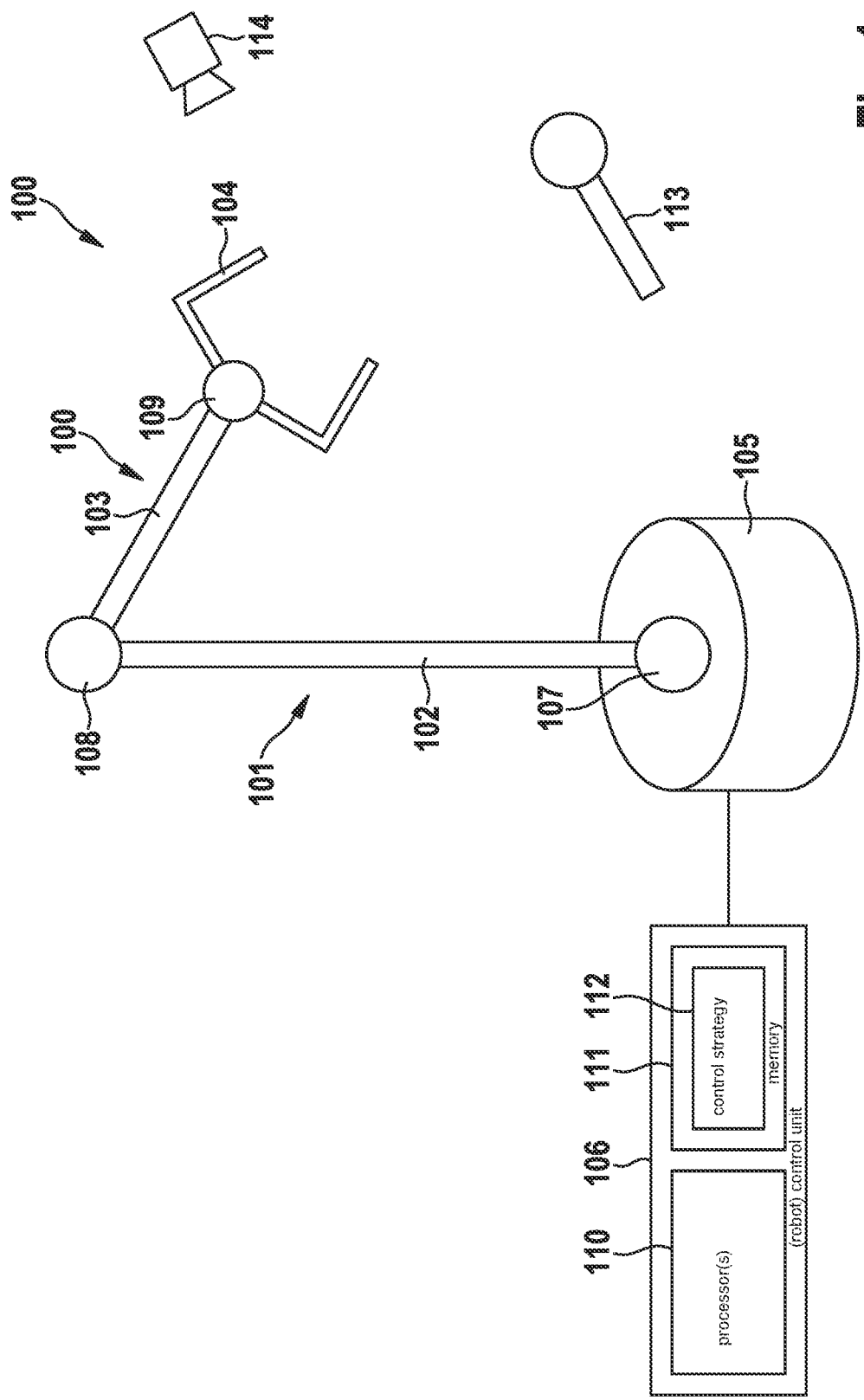
FIG. 1 shows a robot, according to an example embodiment of the present invention.

FIG. 1 shows a robot 100.

Robot 100 includes a robotic arm 101, for example, an industrial robotic arm for handling or mounting a workpiece (or one or multiple other objects). Robotic arm 101 includes manipulators 102, 103, 104 and a base (or support) 105, via which manipulators 102, 103, 104 are supported. The term "manipulator" relates to the moveable elements of robotic arm 101, the actuation of which enables a physical interaction with the surroundings, for example, in order to carry out a task. For the control of robotic arm 101, robot 100 includes a (robot) control unit 106, which is configured to implement the interaction with the surroundings according to a control program. The last element 104 (furthest away from support 105) of manipulators 102, 103, 104 is referred to as end effector 104 and may include one or multiple tools such as, for example, a welding torch, a gripping instrument, a painting tool or the like.

Other manipulators 102, 103 (closer to base 105) may form a positioning device so that, together with end effector 104, robotic arm 101 is provided with end effector 104 at its end. Robotic arm 101 is a mechanical arm, which is able to fulfill functions similar to a human arm (possibly with a tool at its end).

Robotic arm 101 may including joint elements 107, 108, 109, which connect manipulators 102, 103, 104 to one another and to base 105. A joint element 107, 108, 109 may include one or multiple joints, each of which is able to provide a rotational movement (i.e., a rotation) and or a translation movement (i.e., displacement) of associated manipulators relative to one another. The movement of manipulators 102, 103, 104 may be initiated with the aid of actuators, which are controlled by control unit 106.

The term "actuator" may be understood to mean a component, which is designed to influence a mechanism or process in response to its being driven. The actuator may implement commands, which are output by control unit 106 (the so-called activation) into mechanical movements. The actuator, for example, an electromechanical converter, may be configured to convert electrical energy into mechanical energy in response to its activation.

The term "control unit" may be understood to be any type of logic that implements an entity, which may include a circuit and/or a processor, which is/are able to execute a software that is stored in a memory medium, firmware or a combination thereof, and which is able to output commands, for example, to an actuator in the present example. The control unit may, for example, be configured by a program code (for example, software) in order to control the operation of a robot.

In the present example, control unit 106 includes one or multiple processor 110 and a memory 111, which stores a code and data, on the basis of which processor 110 controls robotic arm 101. According to various specific embodiments, control unit 106 controls robotic arm 101 on the basis of a control strategy 112, which is stored in memory 111. Robot 100 is intended, for example, to pick up an object 113. For example, end effector 104 is a gripper and is intended to pick up first object 113, however, end effector 104 may also be configured, for example, to use suction to pick up object 113.

The approach described below may be used not only for robotic arms, but also for controlling various robotic devices such as, for example, legged and walking robots, autonomous vehicles, machines, etc.

In the following exemplary embodiments, the task of controlling a robotic device is modelled as a Markov decision process, i.e. by a tuple (S, A, p, r), S referring to the state, A referring to the action, $p(s_{t+1}|s_t, a_t)$ referring to the transition function and $r(s_t, \alpha_t)$ referring to the (limited) reward function.

State space S and action space A are considered to be continuous.

In each time step t, an agent (which acts according to the control strategy, for example, a robot 100, which acts according to control strategy 112) interacts with the surroundings (i.e., with the control system, for example, the robot with its surroundings, for example, object 113), by observing a state $s_t$ and performing an action $a_t$ as a function of this state. The state (or configuration) includes pieces of information about the robotic device (such as, for example, joint positions) and also of its surroundings (such as, for example, the pose of object 113). The application of action $a_t$ in state $s_t$ results in a new state $s_{t+1}$ and in a reward $r_{t+1}$ as a function of the transition function (i.e., of the transition probabilities) and of the reward function. A stochastic control strategy $\pi_\theta(\alpha_t|s_t)$ is trained by adapting its parameters e is such a way that the rewards obtained (on average via the training data or training batches) are preferably large.

In reinforcement learning with maximization of the entropy, the control strategy is trained not only in such a way that the gain (i.e., the rewards beyond the training) is preferably large, but also the entropy $\mathbb{H}(\pi_\theta(\cdot|s_t))$ of the (probability) distribution, according to which the control strategy selects control actions, is preferably large. This results in the target function (to be maximized)

$$J(\pi_\theta) = \sum_{t=0}^{T} \mathbb{E}_{(s_t, a_t) \sim \mu^{\pi_\theta}} [r(s_t, a_t) + \alpha \mathbb{H}(\pi_\theta(\cdot|s))]$$

The parameter $\alpha$ controls the randomness of the optimal control strategy by establishing how important the entropy term is compared to the reward.

During imitation learning, the true reward $r(s_t, \alpha_t)$ is not available for the training. In contrast, the control strategy is trained in such a way that it imitates the behavior of an expert control strategy (i.e., of a reference control strategy) $\pi_E$, which is reflected in a training data set $D_E$.

Learning from observations (LfO) is a branch of imitation learning, in which the case in which the expert actions are not known is considered. This means that the expert data are of the form $$\mathcal{D}_E^{LfO} := \{s_0^k, s_1^k, \ldots, s_T^k\}_{k=0}^{K}$$

i.e., contain multiple sequences of transitions from one state to the next state (i.e., expert trajectories). It is also assumed that during the training process, an interaction with the surroundings (i.e., with the controlled system which, however, may also be simulated for the training) is possible. This means that control unit 106 is able, for example, to control robotic arm 101 and is then able to ascertain via sensors (such as, for example, a camera 114) the resultant state of the surroundings (robotic arm 101 plus object 113, etc.).

The aim is thus the training of the control strategy, so that it learns the actions from the expert data best suited for respective states of the surroundings on the basis of the behavior of the surroundings and of the transitions.

According to various specific embodiments, this takes place by adapting probability distributions. For this purpose, probability models are used in order to estimate a probability adaptation target in a non-adversarial way. Specifically, normalizing flows, for example, are used in order to estimate the similarity of the state transitions according to the trained control strategy to the expert control strategy. According to various specific embodiments, a forward and backward dynamic model is also used in order to estimate the values of the target function to be optimized during the training.

According to various specific embodiments, the distribution of the trajectories $\mu^{\pi_\theta}$ as generated by the control strategy is adapted to the distribution of the trajectories $\mu^E$ as generated by the expert control strategy, in which the Kullback-Leibler Divergence (KLD) between them is minimized. The two trajectory distributions $\mu^{\pi_\theta}$ and $\mu^E$ are defined by the start state distribution $p(s_0)$ and the respective conditioned state transition distributions:

$$\mu^{\pi_\theta} = p(s_0) \prod_{i=0 \ldots T} \mu^{\pi_\theta}(s_{i+1}|s_i)$$

$$\mu^E = p(s_0) \prod_{i=0 \ldots T} \mu^E(s_{i+1}|s_i)$$

The Kullback-Leibler divergence between these two distributions is provided by $$\mathbb{D}_{KL}(\mu^{\pi_\theta}\|\mu^E) = \mathbb{E}_{*s_0, \ldots, s_T) \sim \pi_\theta}[\log \mu^{\pi_\theta} - \log \mu^E]$$

and describes how close distribution $\mu^{\pi_\theta}$ is to distribution $\mu^E$. Minimizing the Kullback-Leibler divergence (for example, by the control unit 106), results in the control strategy (for example, control strategy 112) generating trajectories, which are preferably similar to the trajectories from the expert data.

Thus, control strategy $\pi_\theta(\alpha_t|s_t)$ is to be trained in such a way, i.e., its parameter set $\theta$ (for example, weights of a neural network) is set according to the optimization problem $$\min \mathbb{D}_{KL}(\mu^{\pi_\theta}\|\mu^E) = \min \mathbb{E}_{(s_i, s_{i+1}) \sim \pi_\theta}[\log \mu^{\pi_\theta}(s_{i+1}|s_i) - \log \mu^E(s_{i+1}|s_i)].$$

Describing this optimization problem using $$\mu^{\pi_\theta}(s_{i+1}|s_i) = \frac{p(s_{i+1}|a_i, s_i)\pi_\theta(a_i|s_i)}{\pi'_\theta(a_i|s_{i+1}, s_i)}$$

yields $$\min \mathbb{D}_{KL}(\mu^{\pi_\theta}\|\mu^E) = \max \mathbb{E}_{(s_i, s_{i+1}) \sim \pi_\theta}[r(s_i, \alpha_i) + \mathbb{H}(\pi_\theta(\alpha_i|s_i))] \quad (1)$$

the reward term being defined by $$r(\alpha_i, s_i) = \mathbb{E}_{(s_{i+1}) \sim p(s_{i+1}|s_i, \alpha_i)}[-\log p(s_{i+1}|s_i, \alpha_i) + \log \pi'_\theta(\alpha_i|s_{i+1}, s_i) + \log \mu^E(s_{i+1}|s_i)] \quad (2)$$

and $$\pi'_\theta(\alpha_i|s_{i+1}, s_i)$$

is the inverse action distribution (or also backward distribution of the surroundings dynamic).

A model for the inverse action distribution function $\pi'_\theta(\alpha_i|s_{i+1}, s_i)$ and a model for the transition distribution $p(s_{i+1}|\alpha_i, s_i)$ (or also forward distribution of the surroundings dynamic) are ascertained according to various specific embodiments by training a conditioned normalizing flow using data that are stored in a buffer (replay buffer) and collected based on control passes (so-called rollouts). These data contain trajectories with associated actions and rewards and may be generated by a real control (for example, of robotic arm 101) but also by simulation of control passes.

The conditioned expert state transition distribution $\mu^E(s_{i+1}|s_i)$ may be learned offline (i.e. outside of or prior to the control passes), for example, by training a conditioned normalizing flow on the pairs made up of state and subsequent state provided by the expert data.

With the distributions thus trained, it is possible to train the control strategy using the target function according to (1), which may be viewed as a maximal entropy target function, using a standard maximal entropy reinforcement learning method, such as, for example, Soft Actor Critic (SAC), the reward (according to (2)) being estimated with the aid of the trained probability models (for example, normalizing flows) for $\mu^E(s_{i+1}|s_i)$, $\pi'_\theta(\alpha_i|s_{i+1}, s_i)$, and $p(s_{i+1}|\alpha_i, s_i)$.

Figure 2:
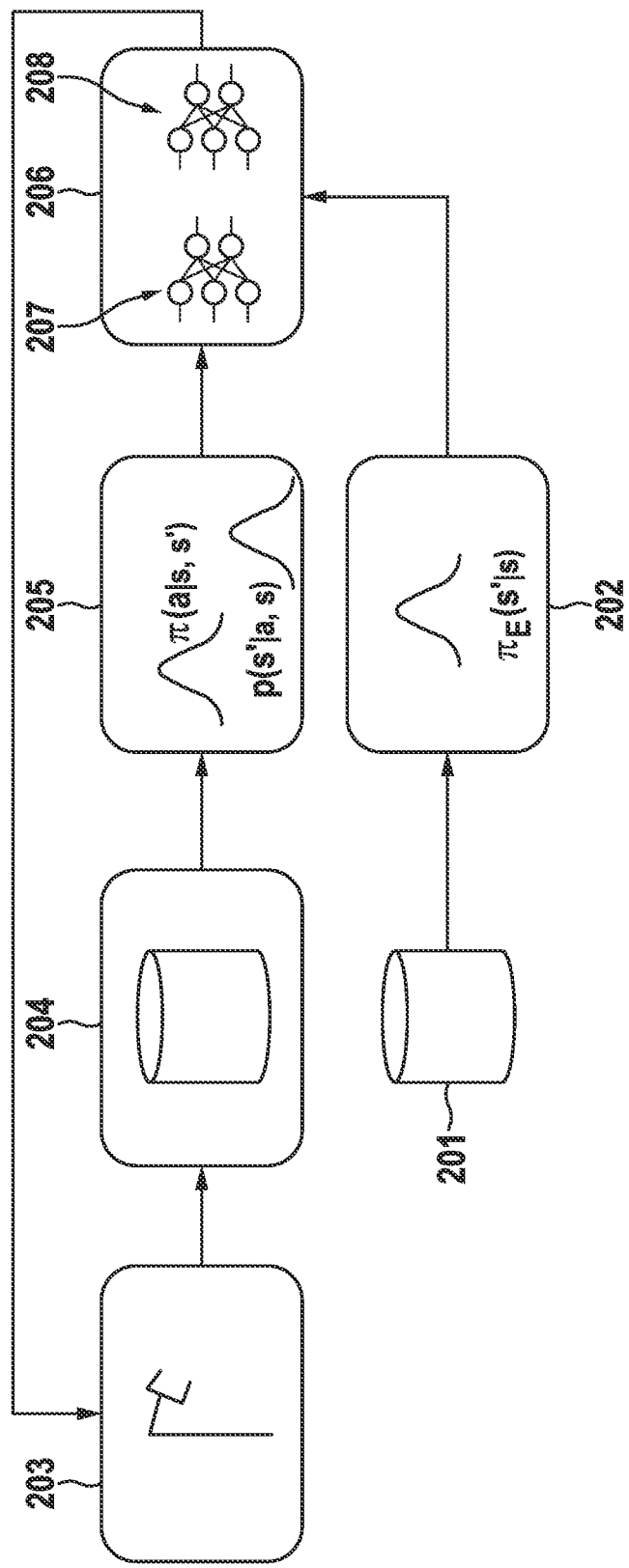
FIG. 2 illustrates the training of a control strategy according to one specific embodiment of the present invention.

FIG. 2 illustrates the training of a control strategy according to one specific embodiment (for example, carried out by control unit 106).

A probability model 202 for $\mu^E(s_{i+1}|s_i)$ is trained from expert data 201. Probability models 205 $p(s_{i+1}|\alpha_i, s_i)$ and $\pi'_{74}(\alpha_i|s_{i+1}, s_i)$ are trained from data from a replay buffer 204, which are obtained via (optionally simulated) control passes, i.e., by interaction with surroundings 203 (for example, robotic arm 101 including its working area such as object 113).

An RL training method 206 (for example, a training method using an actor 207 and a critic 208) uses probability models 205 (for estimating the reward according to (2)) and ascertains the control strategy. In this case, actor 207 interacts for training passes with surroundings 203.

One example of a training algorithm in pseudocode (including the conventional English language key words such as "for," "do," "end," "range," "procedure," etc.) is provided below.

| 1: | procedure SOIL-TDM($D_E$) | |
|---|---|---|
| 2: | train $\mu^E(s_{t+1}|s_t)$ with $D_E:\{s_0, s_1, ... s_T\}_{k=0}^K$ | |
| 3: | for episodes do | |
| 4: | for range(T) do | generate data |
| 5: | $\hat{a}_t \leftarrow$ sample $(\pi_\theta(\hat{a}_t|s_t))$ | |
| 6: | $s_{t+1} \leftarrow p_{sim}(s_{t+1}|s_t, \hat{a}_t)$ | apply action (by interaction with surroundings or simulation) |
| 7: | store $(s_t, \hat{a}_t, s_{t+1})$ in $D_{RB}$ | store in replay buffer |
| 8: | end for | |
| 9: | for range(N) do | update dynamic-model |
| 10: | $\{(s_t, \hat{a}_t, s_{t+1})\}_{i=1}^B \sim D_{RB}$ | sample batch from the replay buffer |
| 11: | train $\mu_\eta(\hat{a}_t|s_{t+1}, s_t)$ and $\mu_\phi(s_{t+1}|\hat{a}_t, s_t)$ | |
| 12: | end for | |
| 13: | for range(N) do | SAC optimization |
| 14: | $\{(s_t, \hat{a}_t, s_{t+1})\}_{i=1}^B \sim D_{RB}$ | |
| 15: | $a_t \leftarrow$ sample $(\pi_\theta(a_t|s_t))$ | sample action from control strategy |
| 16: | optimize $\pi_\theta(a_t|s_t)$ with $J_\pi(a_t, s_t)$ | update control strategy with Q-function |
| 17: | $r(s_t, \hat{a}_t) \leftarrow$ $-\log\mu_\phi(s_{t+1}|\hat{a}_t, s_t) +$ $\log\mu_\eta(a_t|s_{t+1}, s_t) +$ $\log\mu^E(s_{t+1}|s_t)$ | estimate reward |
| 18: | optimize $Q_\Psi(\hat{a}_t, s_t)$ with $J_Q(\hat{a}_t, s_t)$ | update Q-function |
| 19: | end for | |
| 20: | end for | |
| 21: | end procedure | |

In this case, $$J_\pi(a_t, s_t) = \mathbb{E}_{(s_t)\sim D_{RB}}\left[\mathbb{E}_{(a_t)\sim \pi_\theta}[\alpha\log\pi_\theta(a_t \mid s_t) - Q_\Psi(s_t, a_t)]\right]$$

and $$J_Q(\hat{a}_t, s_t) = \mathbb{E}_{(s_t, \hat{a}_t)\sim D_{RB}}\left[\frac{1}{2}(Q_\Psi(s_t, \hat{a}_t) - (r(s_t, \hat{a}_t) + \gamma\mathbb{E}_{s_{t+1}}[V_{\hat{\Psi}}(s_{t+1})]))^2\right]$$

$Q_\Psi$ is the Q-function. In order to increase the stability, a target Q-function $Q_{\hat{\Psi}}$ with parameters $\hat{\Psi}$ is used, which slowly follows the actual Q-function. $V_{\hat{\Psi}}$ is the value function corresponding to these parameters. Parameter $\gamma$ is the discount factor.

In summary, a method according to various specific embodiments is provided as represented in FIG. 6.

Figure 3:
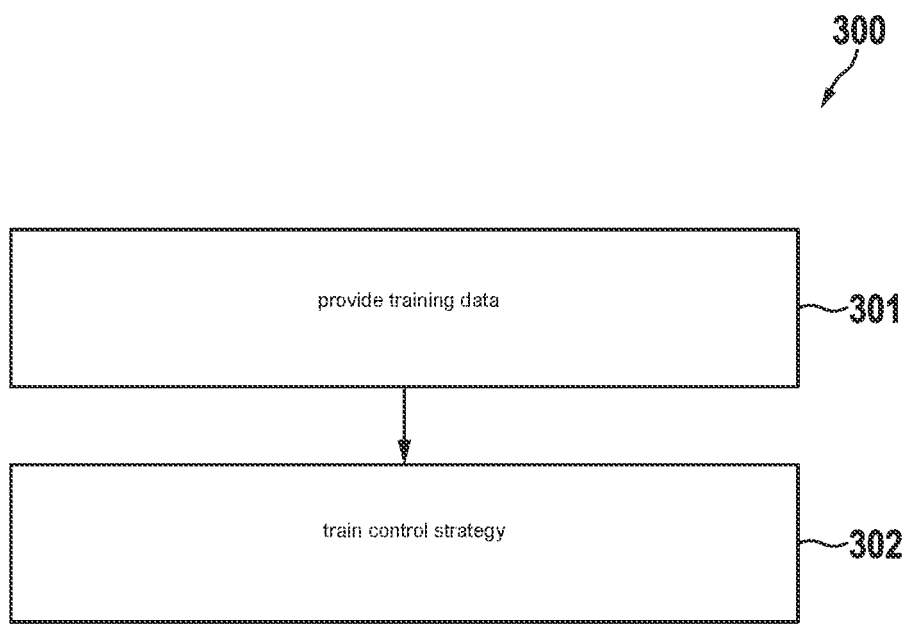
FIG. 3 shows a flowchart, which represents a method for training a control strategy, according to an example embodiment of the present invention.

FIG. 3 shows a flowchart 300, which represents a method for training a control strategy.

In 301, training data are provided, which demonstrate a control behavior, according to which control actions are to be generated.

In 302, the control strategy is trained with the aid of imitation learning by minimizing a measure of deviation between the distribution of state transitions according to the control strategy and the distribution of state transitions according to the demonstrated control behavior using the training data.

The minimization takes place across the search space of parameter values of the control strategy, for example, weights of a neural network.

The training data are provided, for example, by the recording of demonstrations. For example, a user may demonstrate a robotic arm for carrying out a particular task (for example, for various situations such as, for example, starting positions of objects to be picked up) or, in the case of a control strategy for an autonomous vehicle, images of real vehicles may be used.

The method of FIG. 3 may be carried out by one or by multiple computers including one or multiple data processing units. The term "data processing unit" may be understood to mean any type of entity which enables the processing of data or signals. The data or signals may be handled, for example, according to at least one (i.e., one or more than one) specific function, which is carried out by the data processing unit. A data processing unit may include or be designed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA) or any combination thereof. Any other manner for implementing the respective functions, which are described in greater detail herein, may also be understood to be a data processing unit or logic circuit array. One or multiple of the method steps described in detail herein may be carried out (for example, implemented) by a data processing unit via one or multiple specific functions, which are carried out by the data processing unit.

The approach of FIG. 3 is used to generate a control signal for a robotic device. The term "robotic device" may be understood as referring to any physical system (including a mechanical part, whose movement is controlled), such as, for example, a computer-controlled machine, a vehicle, a household appliance, a power tool, a manufacturing machine, a personal assistant or an access control system. A control rule for the physical system is used and the physical system is then controlled accordingly.

The approach of FIG. 3 may, for example, be used for applications, in which expert demonstrations are present as video recordings without additional sensor signals. One example is the training of traffic agents in a simulation, so that the traffic agents drive like real road users, the expert data containing recordings of road traffic from a bird's eye view. In this case, there are no direct pieces of information available about the vehicle physics, the gas pedal and the steering angle. These values must therefore be estimated on the basis of sometimes incomplete pieces of information in order to train an agent to imitate the observed behavior. Thus, methods that do not rely on actions from these expert data have an advantage, since fewer values are required to be estimated.

According to various specific embodiments, a control strategy is trained for the control of a vehicle using previously recorded and collected expert demonstrations as training data (for example, the HighD data set). The control strategy in this case is optimized in such a way that it selects control actions (as a function of the respective state), which result in state trajectories as they are present in the expert demonstrations. The optimization thereof with respect to similar control actions in this case occurs indirectly. The control strategy is optimized to generate state trajectories similar to the expert state trajectories.

Various specific embodiments may receive and use sensor signals from various sensors such as, for example, video, radar, LIDAR, ultrasound, movement, thermal imaging, etc., for example, in order to obtain sensor data with respect to demonstrations or states of the system (robot and object or objects) and configurations and scenarios. The sensor data may be processed. This may include the classification of the sensor data or the implementation of a semantic segmentation on the sensor data, for example, in order to detect the presence of objects (in the surroundings, in which the sensor data have been obtained). Specific embodiments may be used for training a machine learning system and for controlling a robot, for example, autonomously by robotic manipulators, in order to achieve various manipulation tasks using various scenarios. Specific embodiments are applicable, in particular, to the control and monitoring of the execution of manipulation tasks, for example, in assembly lines.

Although specific embodiments have been represented and described herein, those skilled in the art will recognize that the specific embodiments shown and described may be replaced by a variety of alternative and/or equivalent implementations without departing from the scope of protection of the present invention. This application is intended to cover any adaptations or variations of the specific embodiments discussed herein.

What is claimed is:

1. A method for training a control strategy, comprising the following steps:
   providing training data, which demonstrate a control behavior, according to which control actions are to be generated; and
   training the control strategy using imitation learning by minimizing a measure of deviation between a distribution of state transitions according to the control strategy and a distribution of state transitions according to the demonstrated control behavior using the training data, the measure of deviation being minimized by applying a maximal entropy reinforcement learning method to a reward, whose shared maximization with an entropy of the control strategy corresponds to a minimization of the measure of deviation;
   wherein a training of a conditioned normalizing flow probability model for the transition distribution and of a conditioned normalizing flow probability model for the inverse action distribution and minimization of the measure of deviation using the trained conditioned normalizing flow probability models take place, and the reward is estimated using the trained conditioned normalizing flow probability model for the transition distribution and the trained conditioned normalizing flow probability model for the inverse action distribution.

2. The method as recited in claim 1, wherein the measure of deviation is: (i) a Kullback-Leibler divergence between the distribution of state transitions according to the control strategy and the distribution of state transitions according to the demonstrated control behavior, or (ii) the Kullback-Leibler divergence between the distribution of state transitions according to the demonstrated control behavior and the distribution of state transitions according to the control strategy.

3. The method as recited in claim 1, further comprising:
   training a conditioned normalizing flow probability model for the distribution of state transitions according to the demonstrated control behavior and minimizing the measure of deviation using the trained conditioned normalizing flow probability model for the transition distribution, the trained conditioned normalizing flow probability model for the inverse action distribution and the trained conditioned normalizing flow probability model for the distribution of state transitions, the reward being estimated using the trained conditioned normalizing flow probability model for the transition distribution, the trained conditioned normalizing flow probability model for the inverse action distribution and the trained conditioned normalizing flow probability model for the distribution of state transitions.

4. A method for generating a control action, comprising the following steps:
   training a control strategy by:
      providing training data, which demonstrate a control behavior, according to which control actions are to be generated, and
      training the control strategy using imitation learning by minimizing a measure of deviation between a distribution of state transitions according to the control strategy and a distribution of state transitions according to the demonstrated control behavior using the training data, the measure of deviation being minimized by applying a maximal entropy reinforcement learning method to a reward, whose shared maximization with an entropy of the control strategy corresponds to a minimization of the measure of deviation,
      wherein a training of a conditioned normalizing flow probability model for the transition distribution and of a conditioned normalizing flow probability model for the inverse action distribution and minimization of the measure of deviation using the trained conditioned normalizing flow probability models take place, and the reward is estimated using the trained conditioned normalizing flow probability model for the transition distribution and the trained conditioned normalizing flow probability model for the inverse action distribution; and generating a control action according to the trained control strategy.

5. A control unit configured to train a control strategy, the control unit configured to:
provide training data, which demonstrate a control behavior, according to which control actions are to be generated; and
train the control strategy using imitation learning by minimizing a measure of deviation between a distribution of state transitions according to the control strategy and a distribution of state transitions according to the demonstrated control behavior using the training data, the measure of deviation being minimized by applying a maximal entropy reinforcement learning method to a reward, whose shared maximization with an entropy of the control strategy corresponds to a minimization of the measure of deviation;
wherein the control unit is configure to train a conditioned normalizing flow probability model for the transition distribution and a conditioned normalizing flow probability model for the inverse action distribution and minimization of the measure of deviation using the trained conditioned normalizing flow probability models, and the reward is estimated using the trained conditioned normalizing flow probability model for the transition distribution and the trained conditioned normalizing flow probability model for the inverse action distribution.

6. A method for testing a control method for a robotic device, comprising:
simulating a control scenario including multiple different robotic devices, the robotic devices being controlled according to control actions, which are ascertained by:
training a control strategy by:
providing training data, which demonstrate a control behavior, according to which control actions are to be generated, and
training the control strategy using imitation learning by minimizing a measure of deviation between a distribution of state transitions according to the control strategy and a distribution of state transitions according to the demonstrated control behavior using the training data, the measure of deviation being minimized by applying a maximal entropy reinforcement learning method to a reward, whose shared maximization with an entropy of the control strategy corresponds to a minimization of the measure of deviation,
wherein a training of a conditioned normalizing flow probability model for the transition distribution and of a conditioned normalizing flow probability model for the inverse action distribution and minimization of the measure of deviation using the trained conditioned normalizing flow probability models take place, and the reward is estimated using the trained conditioned normalizing flow probability model for the transition distribution and the trained conditioned normalizing flow probability model for the inverse action distribution; and generating the control actions according to the trained control strategy.

7. A non-transitory computer-readable medium on which are stored commands for training a control strategy, the commands, when executed by a processor, causing the processor to perform the following steps:
providing training data, which demonstrate a control behavior, according to which control actions are to be generated; and
training the control strategy using imitation learning by minimizing a measure of deviation between a distribution of state transitions according to the control strategy and a distribution of state transitions according to the demonstrated control behavior using the training data, the measure of deviation being minimized by applying a maximal entropy reinforcement learning method to a reward, whose shared maximization with an entropy of the control strategy corresponds to a minimization of the measure of deviation;
wherein a training of a conditioned normalizing flow probability model for the transition distribution and of a conditioned normalizing flow probability model for the inverse action distribution and minimization of the measure of deviation using the trained conditioned normalizing flow probability models take place, and the reward is estimated using the trained conditioned normalizing flow probability model for the transition distribution and the trained conditioned normalizing flow probability model for the inverse action distribution.

\* \* \* \* \*